US007781728B2

(12) United States Patent
Senko et al.

(10) Patent No.: US 7,781,728 B2
(45) **Date of Patent: *Aug. 24, 2010**

(54) ION TRANSPORT DEVICE AND MODES OF OPERATION THEREOF

(75) Inventors: Michael W. Senko, Sunnyvale, CA (US); Viatcheslav V. Kovtoun, Santa Clara, CA (US); Paul R. Atherton, San Jose, CA (US); Jean Jacques Dunyach, San Jose, CA (US); Eloy R. Wouters, San Jose, CA (US); Maurizio Splendore, Walnut Creek, CA (US); William Siebert, Los Altos, CA (US)

(73) Assignee: Thermo Finnigan LLC, San Jose, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 12/125,013

(22) Filed: May 21, 2008

(65) Prior Publication Data

US 2009/0045062 A1 Feb. 19, 2009

Related U.S. Application Data

(63) Continuation-in-part of application No. 11/764,100, filed on Jun. 15, 2007, now Pat. No. 7,514,673.

(60) Provisional application No. 61/024,868, filed on Jan. 30, 2008.

(51) Int. Cl.
*H01J 3/14* (2006.01)
*B01D 59/44* (2006.01)

(52) U.S. Cl. ...................... 250/281; 250/282; 250/286; 250/290; 250/396 R; 313/360.1; 315/111.81; 315/111.61; 315/5.39

(58) Field of Classification Search ................ 250/281, 250/282, 286, 290, 396 R; 315/111.81, 111.61, 315/5.39; 313/360.1
See application file for complete search history.

(56) References Cited

U.S. PATENT DOCUMENTS

| | | | | |
|---|---|---|---|---|
| 7,164,122 | B2 * | 1/2007 | Fuhrer et al. | 250/287 |
| 7,459,693 | B2 | 12/2008 | Park et al. | |
| 7,514,673 | B2 * | 4/2009 | Senko et al. | 250/281 |

* cited by examiner

*Primary Examiner*—Nikita Wells
(74) *Attorney, Agent, or Firm*—Charles B. Katz

(57) ABSTRACT

A device for transporting and focusing ions in a low vacuum or atmospheric-pressure region of a mass spectrometer is constructed from a plurality of longitudinally spaced apart electrodes to which oscillatory (e.g., radio-frequency) voltages are applied. In order to create a tapered field that focuses ions to a narrow beam near the device exit, the inter-electrode spacing or the oscillatory voltage amplitude is increased in the direction of ion travel.

34 Claims, 8 Drawing Sheets

ION TRANSPORT DEVICE AND MODES OF OPERATION THEREOF

CROSS-REFERENCE TO RELATED APPLICATIONS

This application is a continuation-in-part and claims the priority benefit under 35 U.S.C. §120 of U.S. patent application Ser. No. 11/764,100 by Senko et al., entitled "Ion Transport Device" and filed Jun. 15, 2007, now U.S. Pat. No. 7,514,673 and further claims the priority benefit under 35 U.S.C. §119 of U.S. Provisional Patent Application Ser. No. 61/024,868 by Splendore et al., entitled "Ion Transport Device and Mode of Operation Therefor" and filed Jan. 30, 2008. The disclosures of the foregoing patent applications are incorporated herein by reference.

FIELD OF THE INVENTION

The present invention relates generally to ion optics for mass spectrometers, and more particularly to a device for confining and focusing ions in a low vacuum region.

BACKGROUND OF THE INVENTION

A fundamental challenge faced by designers of mass spectrometers is the efficient transport of ions from the ion source to the mass analyzer, particularly through atmospheric or low vacuum regions where ion motion is substantially influenced by interaction with background gas molecules. While electrostatic optics are commonly employed in these regions of commercially available mass spectrometer instruments for ion focusing, it is known that the effectiveness of such devices is limited due to the large numbers of collisions experienced by the ions. Consequently, ion transport losses through the low vacuum regions tend to be high, which has a significant adverse impact on the instrument's overall sensitivity.

Various approaches have been proposed in the mass spectrometry art for improving ion transport efficiency in low vacuum regions. One approach is embodied by the ion funnel device described in U.S. Pat. No. 6,107,628 to Smith et al. Roughly described, the ion funnel device consists of a multitude of closely longitudinally spaced ring electrodes having apertures that decrease in size from the entrance of the device to its exit. The electrodes are electrically isolated from each other, and radio-frequency (RF) voltages are applied to the electrodes in a prescribed phase relationship to radially confine the ions to the interior of the device. The relatively large aperture size at the device entrance provides for a large ion acceptance area, and the progressively reduced aperture size creates a "tapered" RF field having a field-free zone that decreases in diameter along the direction of ion travel, thereby focusing ions to a narrow beam which may then be passed through the aperture of a skimmer or other electrostatic lens without incurring a large degree of ion losses. Refinements to and variations on the ion funnel device are described in (for example) U.S. Pat. No. 6,583,408 to Smith et al., U.S. Pat. No. 7,064,321 to Franzen, EP App. No. 1,465,234 to Bruker Daltonics, and Julian et al., "Ion Funnels for the Masses: Experiments and Simulations with a Simplified Ion Funnel", J. Amer. Soc. Mass Spec., vol. 16, pp. 1708-1712 (2005).

While the ion funnel device has been used successfully in research environments, its implementation in commercial mass spectrometer instruments may be hindered by issues of cost and manufacturability. A typical ion funnel utilizes approximately 100 ring electrodes, each having a unique aperture diameter. This design results in a high part count and elevated manufacturing cost and complexity. Furthermore, the use of a large number of ring electrodes creates a very high capacitive load, which requires a high-power amplifier to drive the circuit.

SUMMARY

In accordance with one embodiment of the invention, an ion transport device is provided consisting of a plurality of apertured electrodes which are spaced apart along the longitudinal axis of the device. The electrode apertures define an ion channel along which ions are transported between an entrance and an exit of the device. An oscillatory (e.g., RF) voltage source, coupled to the electrodes, supplies oscillatory voltages in an appropriate phase relationship to the electrodes to radially confine the ions. In order to provide focusing of ions to the centerline of the ion channel near the device exit, the spacing between adjacent electrodes increases in the direction of ion travel. The relatively greater inter-electrode spacing near the device exit provides for proportionally increased oscillatory field penetration, thereby creating a tapered field that concentrates ions to the longitudinal centerline. The magnitudes of the oscillatory voltages may be temporally varied in a scanned or stepped manner in order to optimize transmission of certain ion species or to reduce mass discrimination effects. A longitudinal DC field, which assists in propelling ions along the ion channel, may be created by applying a set of DC voltages to the electrodes.

In accordance with a second embodiment of the invention, an ion transport device includes a plurality of regularly-spaced apertured electrodes having oscillatory voltages applied thereto. The tapered field for focusing the ions to the ion channel centerline is generated by increasing the amplitude of the oscillatory voltage in the direction of ion travel.

In either embodiment, streaming of clusters, neutrals and undesolvated droplets to the downstream, lower-pressure regions of the mass spectrometer may be reduced by one or a combination of techniques, including laterally and/or angularly offsetting the capillary with respect to the ion transport device entrance and laterally offsetting electrode apertures relative to apertures of adjacent electrodes to block a line-of-sight path.

DETAILED DESCRIPTION OF EMBODIMENTS

Figure 1:
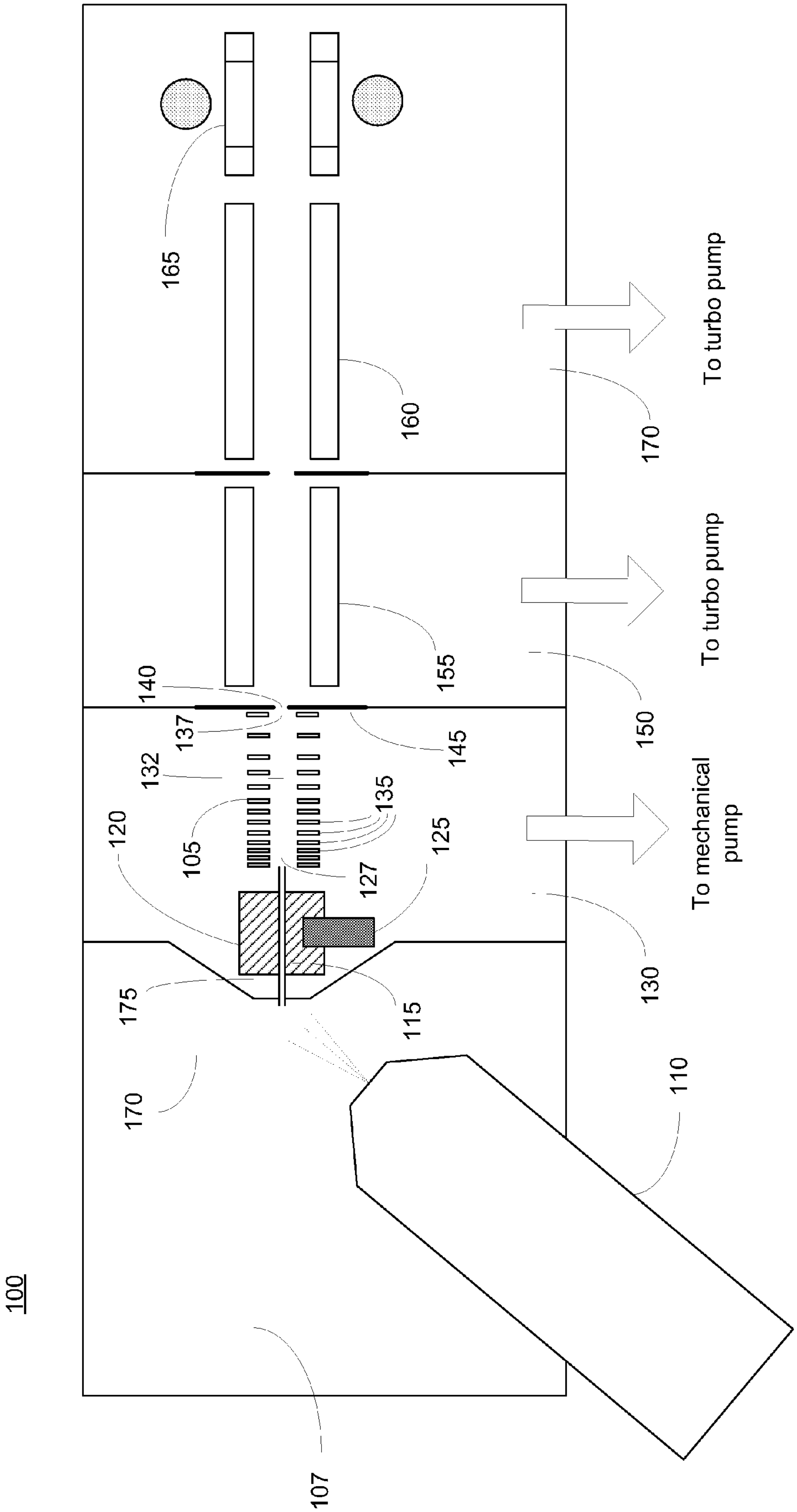
FIG. 1 is a schematic depiction of a mass spectrometer incorporating an ion transport device constructed in accordance with a first embodiment of the invention, wherein electrode spacing is increased in the direction of ion travel to create a tapered focusing field.

FIG. 1 is a schematic depiction of a mass spectrometer 100 incorporating an ion transport device 105 constructed in accordance with a first embodiment of the invention. Analyte ions may be formed by electrospraying a sample solution into an ionization chamber 107 via an electrospray probe 110. For an ion source that utilizes the electrospray technique, ionization chamber 107 will generally be maintained at or near atmospheric pressure. The analyte ions, together with background gas and partially desolvated droplets, flow into the inlet end of a conventional ion transfer tube 115 (e.g., a narrow-bore capillary tube) and traverse the length of the tube under the influence of a pressure gradient. In order to increase ion throughput from ionization chamber 107, multiple ion flow channels may be provided by substituting multiple capillaries or a divided flow path ion transfer tube for the single channel ion transfer tube depicted herein. Analyte ion transfer tube 115 is preferably held in good thermal contact with a block 120 that is heated by cartridge heater 125. As is known in the art, heating of the ion/gas stream passing through ion transfer tube 115 assists in the evaporation of residual solvent and increases the number of analyte ions available for measurement. The analyte ions emerge from the outlet end of ion transfer tube 115, which opens to an entrance 127 of the ion transport device 105 located within low vacuum chamber 130. As indicated by the arrow, chamber 130 is evacuated to a low vacuum pressure by a mechanical pump or equivalent. Under typical operating conditions, the pressure within low vacuum chamber will be in the range of 1-10 Torr (approximately 1-10 millibar), but it is believed that an ion transport device according to embodiments of the present invention may be successfully operated over a broad range of low vacuum and near-atmospheric pressures, e.g., between 0.1 millibar and 1 bar.

It should be understood that the electrospray ionization source depicted and described herein is presented by way of an illustrative example, and that the ion transport device of the present invention should not be construed as being limited to use with an electrospray or other specific type of ionization source. Other ionization techniques that may be substituted for (or used in addition to) the electrospray source include chemical ionization, photo-ionization, and laser desorption or matrix-assisted laser desorption/ionization (MALDI).

The analyte ions exit the outlet end of ion transfer tube 115 as a free jet expansion and travel through an ion channel 132 defined within the interior of ion transport device 105. As will be discussed in further detail below, radial confinement and focusing of ions within ion channel 132 are achieved by application of oscillatory voltages to apertured electrodes 135 of ion transport device 105. As is further discussed below, transport of ions along ion channel 132 to device exit 137 may be facilitated by generating a longitudinal DC field and/or by tailoring the flow of the background gas in which the ions are entrained. Ions leave ion transport device 105 as a narrowly focused beam and are directed through aperture 140 of extraction lens 145 into chamber 150. The ions pass thereafter through ion guides 155 and 160 and are delivered to a mass analyzer 165 (which, as depicted, may take the form of a conventional two-dimensional quadrupole ion trap) located within chamber 170. Chambers 150 and 170 may be evacuated to relatively low pressures by means of connection to ports of a turbo pump, as indicated by the arrows. While ion transport device 105 is depicted as occupying a single chamber, alternative implementations may utilize an ion transport device that bridges two or more chambers or regions of successively reduced pressures.

Figure 2:
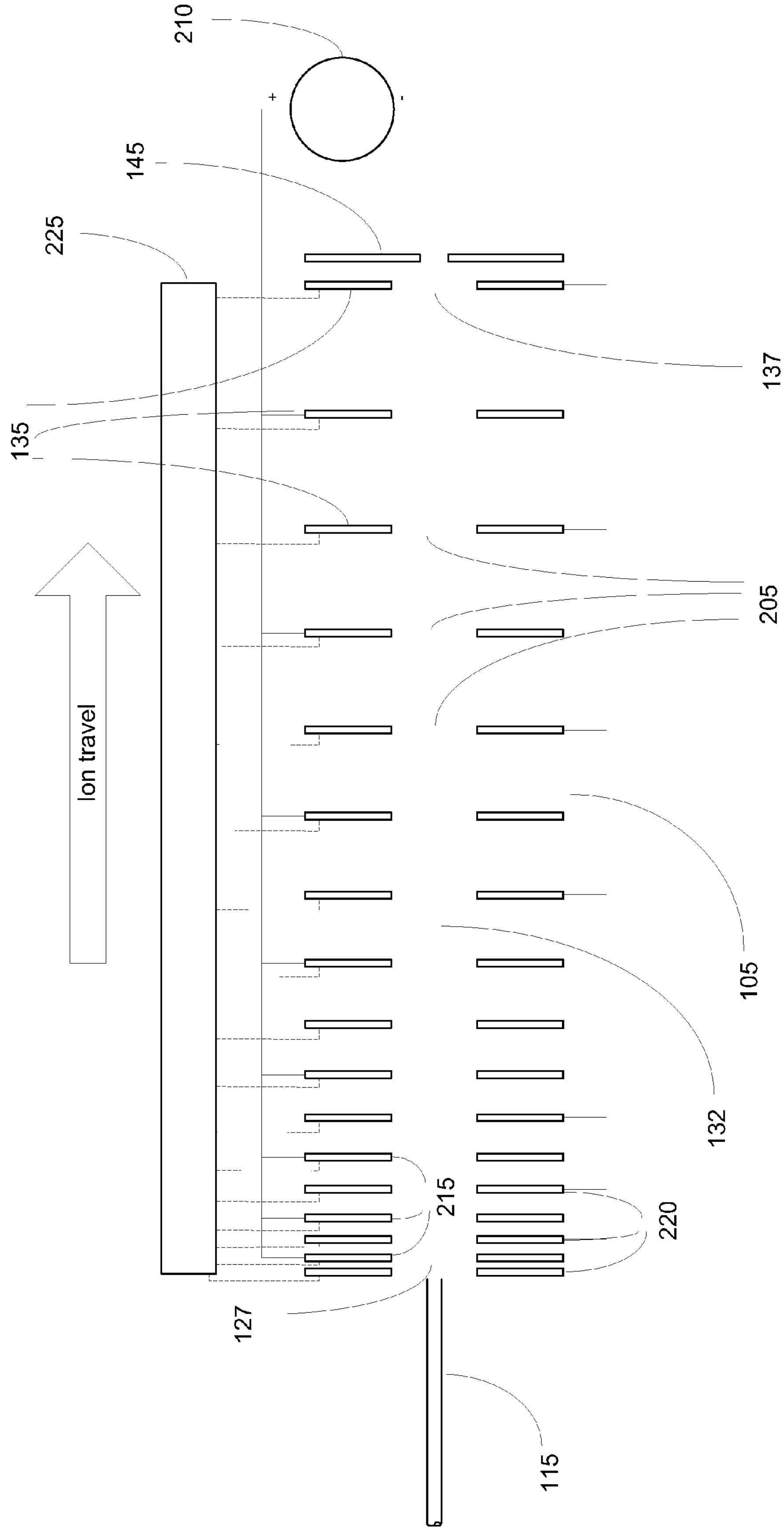
FIG. 2 depicts in greater detail the ion transport device used in the mass spectrometer of FIG. 1.

FIG. 2 depicts (in rough cross-sectional view) details of ion transport device 105. Ion transport device 105 is formed from a plurality of generally planar electrodes 135 arranged in longitudinally spaced-apart relation (as used herein, the term "longitudinally" denotes the axis defined by the overall movement of ions along ion channel 132). Devices of this general construction are sometimes referred to in the mass spectrometry art as "stacked-ring" ion guides. Each electrode 135 is adapted with an aperture 205 through which ions may pass. The apertures collectively define an ion channel 132, which may be straight or (as discussed below in connection with FIG. 4) curved, depending on the lateral alignment of the apertures. To improve manufacturability and reduce cost, all of the electrodes 135 may have identically sized apertures 205 (in contradistinction to the device disclosed in the aforementioned U.S. Pat. No. 6,107,628 to Smith et al., wherein each electrode possesses a uniquely sized aperture). An oscillatory (e.g., radio-frequency) voltage source 210 applies oscillatory voltages to electrodes 135 to thereby generate a field that radially confines ions within ion channel 132. According to a preferred embodiment, each electrode 135 receives an oscillatory voltage that is equal in amplitude and frequency but opposite in phase to the oscillatory voltage applied to the adjacent electrodes. As depicted, electrodes 135 may be divided into a plurality of first electrodes 215 interleaved with a plurality of second electrodes 220, with the first electrodes 215 receiving an oscillatory voltage that is opposite in phase with respect to the oscillatory voltage applied to the second electrodes 220. In a typical implementation, the frequency and amplitude of the applied oscillatory voltages are 0.5-1 MHz and 50-400 Vp-p (peak-to-peak), the required amplitude being strongly dependent on frequency. It should be noted that the number of electrodes 135 depicted in the figures has been chosen arbitrarily, and should not be construed to limit the invention to any particular number of electrodes. Typical implementations of an ion transport device having a length of 50 mm will have between 12 and 24 electrodes. Due to the increased inter-electrode spacing near the device exit, an ion transport device constructed in accordance with this embodiment of the invention will generally utilize fewer electrodes relative to the conventional ion funnel device described in U.S. Pat. No. 6,107,628 to Smith et al. and the related publications cited above.

To create a tapered electric field that focuses the ions to a narrow beam proximate device exit 137, the longitudinal spacing of electrodes 135 increases in the direction of ion travel. It is known in the art (see, e.g., U.S. Pat. No. 5,572,035 to Franzen as well as the aforementioned Julian et al. article) that the radial penetration of an oscillatory field in a stacked ring ion guide is proportional to the inter-electrode spacing.

Near entrance 127, electrodes 135 are relatively closely spaced, which provides limited radial field penetration, thereby producing a wide field-free region around the longitudinal axis. This condition promotes high efficiency of acceptance of ions flowing from ion transfer tube 115 into ion channel 132. Furthermore, the close spacing of electrodes near entrance 127 produces a strongly reflective surface and shallow pseudo-potential wells that do not trap ions of a diffuse ion cloud. In contrast, electrodes 135 positioned near exit 137 are relatively widely spaced, which provides effective focusing of ions (due to the greater radial oscillatory field penetration and narrowing of the field-free region) to the central longitudinal axis. It is believed that the relatively wide inter-electrode spacing near device exit 137 will not cause significant ion loss, because ions are cooled toward the central axis as they travel along ion channel 132. In one exemplary implementation of ion transport device 105, the longitudinal inter-electrode spacing (center-to center) varies from 1 mm at device entrance 127 to 5 mm at device exit 137.

In the FIG. 2 embodiment, the electrode spacing is depicted as gradually and continually increasing in the direction of ion travel along the full length of ion transport device 105. In other implementations, electrode spacing may be regular along one or more segments of the ion transport device length (e.g., proximate to the device entrance), and then increase along another segment (e.g., proximate to the device exit). Furthermore, certain implementations may utilize a design in which the electrode spacing increases in a stepped rather than gradual manner.

Under certain conditions (e.g., where the operating pressure is relatively high), ions traveling through ion transport device 105 may become stalled (i.e., trapped within wells between electrodes) if they do not possess sufficient kinetic energy to overcome the pseudo-potential barriers. To avoid this problem, a longitudinal DC field may be created within ion channel 132 by providing a DC voltage source 225 that applies a set of DC voltages to electrodes 135. The applied voltages increase or decrease in the direction of ion travel, depending on the polarity of the transported ions. The longitudinal DC field assists in propelling ions toward device exit 137 and ensures that undesired trapping does not occur. Under typical operating conditions, a longitudinal DC field gradient of 1-2V/mm is sufficient to eliminate stalling of ions within ion transfer device 105. In alternate embodiments, a longitudinal DC field may be generated by applying suitable DC voltages to auxiliary electrodes (e.g., a set of resistively-coated rod electrodes positioned outside the ring electrodes) rather than to ring electrodes 135.

For some applications, it may be advantageous to have the capability of selectively operating ion transport device 105 in a trapping mode, whereby the ions received through entrance 127 (or a portion thereof) are retained within ion channel 132 for a trapping period of controllable duration. Trapping may be achieved by causing DC voltage source 225 to apply appropriate DC barrier voltages to certain of ring electrodes 135 and thereby generate a DC potential well that axially confines ions. When it is desirable to release the ions from ion transport device 105, the barrier DC voltages are removed, and ions traverse the length of ion channel 132 to exit 137 under the influence of a pressure gradient and optional longitudinal DC field. In a variant of this technique, a set of traveling DC pulses, of the type described in U.S. Pat. No. 6,914,241 by Giles et al. (the disclosure of which is incorporated herein by reference) are applied to electrodes 135 to create one or more trapping volumes that are propagated along the length of ion transport device 105. It may also be desirable to effect ion-mobility based separation of ions within ion transport device 105 to, for example, separate potentially interfering isobaric ions. If separation by ion mobility is desired, ion transport device 105 will preferably be axially elongated and/or will be maintained at relatively high pressures in order to produce operationally meaningful separation of ions having different mobilities.

Figure 3:
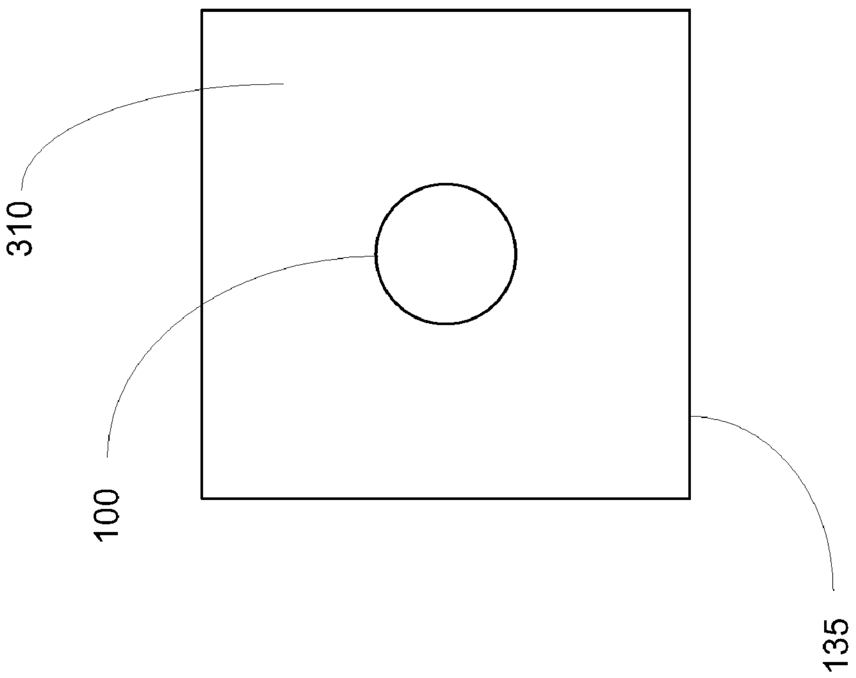
FIG. 3 depicts an example of an apertured electrode used in the ion transport device of FIG. 2.

As shown in FIG. 3, each electrode 135 may consist of a square plate 310 adapted with a centrally located circular aperture 205. As noted above, part count and manufacturing costs may be reduced by utilizing interchangeable electrodes of identical dimensions and aperture size. Plate 310 may be wholly fabricated from an electrically conductive material, such as stainless steel or brass. In an alternative construction, the electrode may be formed by depositing (to an appropriate thickness and over a suitable area) a conductive material on the central region (i.e., the region radially adjacent to the aperture) of an insulative substrate, such as that used for printed circuit boards. A set of conductive traces may also be deposited between the central region and the edge of the plate to establish electrical connections to the oscillatory and/or DC voltage sources. In a typical implementation of ion transport device 105, each electrode 135 has lateral dimensions of 25 mm by 25 mm, a thickness of 0.5 mm, and a circular aperture 205 having a diameter of 2-15 mm.

Figure 4:
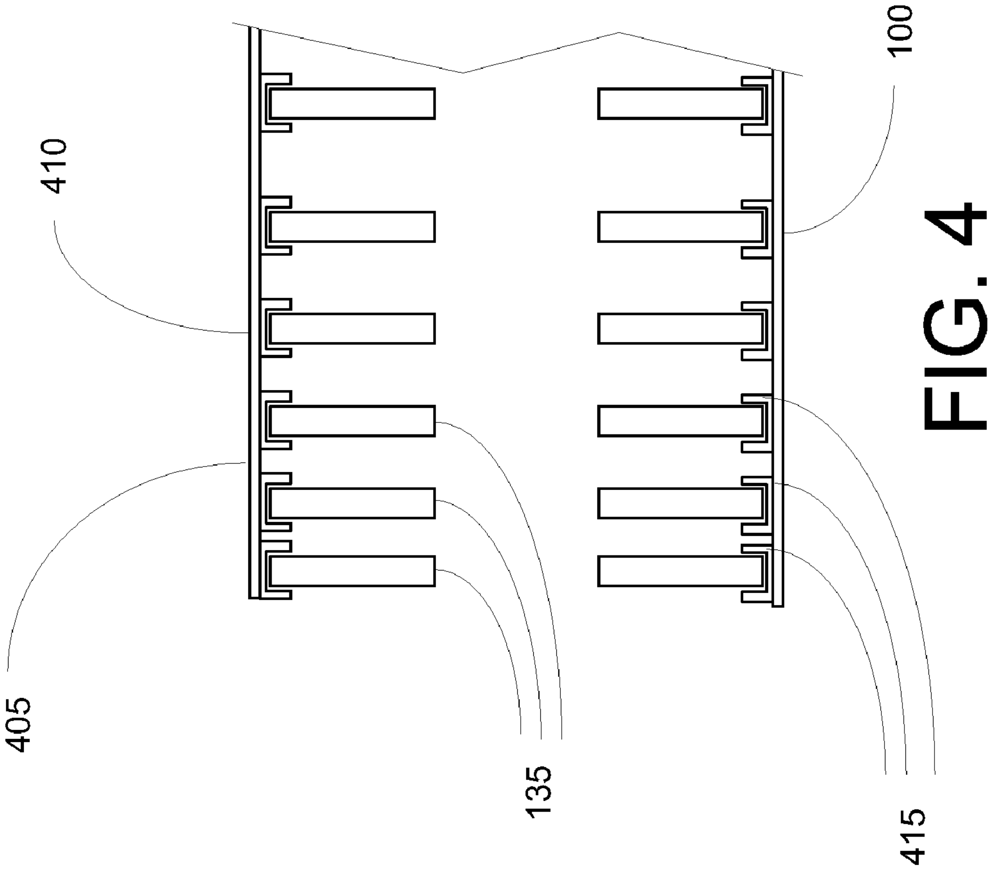
FIG. 4 depicts a portion of an ion transport device having an enclosure to promote gas-assisted ion transport.

Ion transport device 105 may be constructed in an open configuration, as shown in FIG. 2, whereby the gaps between electrodes 135 are open to and communicate with chamber 130. This design allows gas from the ion/gas stream to be removed through the gaps between the electrodes. Electrodes 135 may be assembled and aligned to each other and fixed at the prescribed inter-electrode spacings using a set of insulative support rods and spacers, in the manner described in U.S. Pat. No. 6,107,628 to Smith et al. In an alternative implementation, all or a portion of electrodes 135 may be located within an enclosure, which obstructs the direct outflow of gas from the inter-electrode gaps to chamber 130 and thereby preserves a relatively high gas flow along the enclosed portion of the ion channel. This gas flow assists in the transport of ions along the ion channel and may avoid the need to provide a longitudinal DC field of the type described above. Referring to FIG. 4, an enclosure 405 may be formed from a rectilinear arrangement of plates 410. Electrodes 135 may be mounted within enclosure 405 using edge connectors 415, which fix the inter-electrode spacing at the desired values and provide connections for the oscillatory and optional DC voltages.

Figure 5:
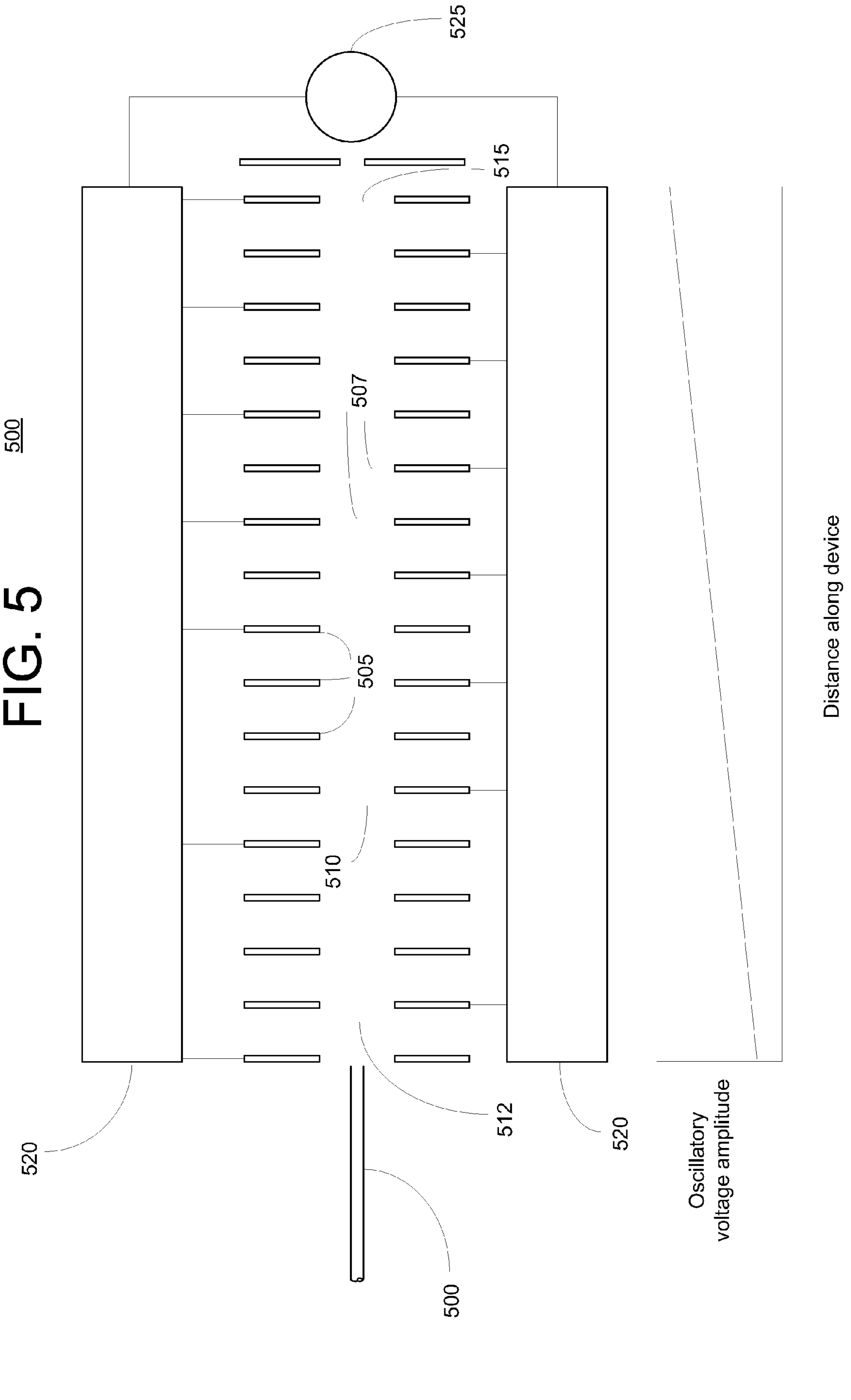
FIG. 5 depicts a second embodiment of the ion transport device, wherein a tapered focusing field is created by increasing the amplitude of the applied oscillatory voltage in the direction of ion travel.

FIG. 5 depicts an ion transport device 500 constructed in accordance with a second embodiment of the invention. In contrast to the FIG. 2 embodiment, electrodes 505, each of which is adapted with an identically sized aperture 507, are regularly spaced along the longitudinal axis. The electrodes 505 collectively define an ion channel 510. To generate the tapered radial field that promotes a high ion acceptance efficiency at device entrance 512 and tight focusing of the ion beam at device exit 515, the amplitude of oscillatory voltages applied to electrodes 505 increase in the direction of ion travel, such that each electrode 505 receives an oscillatory voltage of greater amplitude relative to electrodes in the upstream direction. This increase in oscillatory voltage amplitude is represented by the graph depicted in FIG. 5. The desired oscillatory voltages may be delivered through a set of attenuator circuits 520 coupled to oscillatory voltage source 525. In one implementation of ion transport device 500, electrodes 505 are spaced on 1-1.5 mm centers, and the oscillatory voltage has a frequency of 0.5-1 MHz and an amplitude that varies from 50-100 Vp-p at device entrance 510 to 400-600 Vp-p at device exit 515. The required maximum amplitude of the applied oscillatory voltage is dependent on the inter-electrode spacing, and may be reduced by utilizing a wider spacing (e.g., spacing on 4 mm centers may reduce the maximum applied voltage to 100 Vp-p). A DC voltage source (not depicted), coupled to electrodes 505, may apply a set of DC voltages in the manner described above in connection with the FIG. 2 embodiment to generate a longitudinal DC field gradient that assists to propel ions along ion channel 510. Alternatively or additionally, longitudinal ion transport through the device may be facilitated by locating electrodes 505 within an enclosure, such that a relatively high gas flow rate is maintained within ion channel 510.

Figure 6:
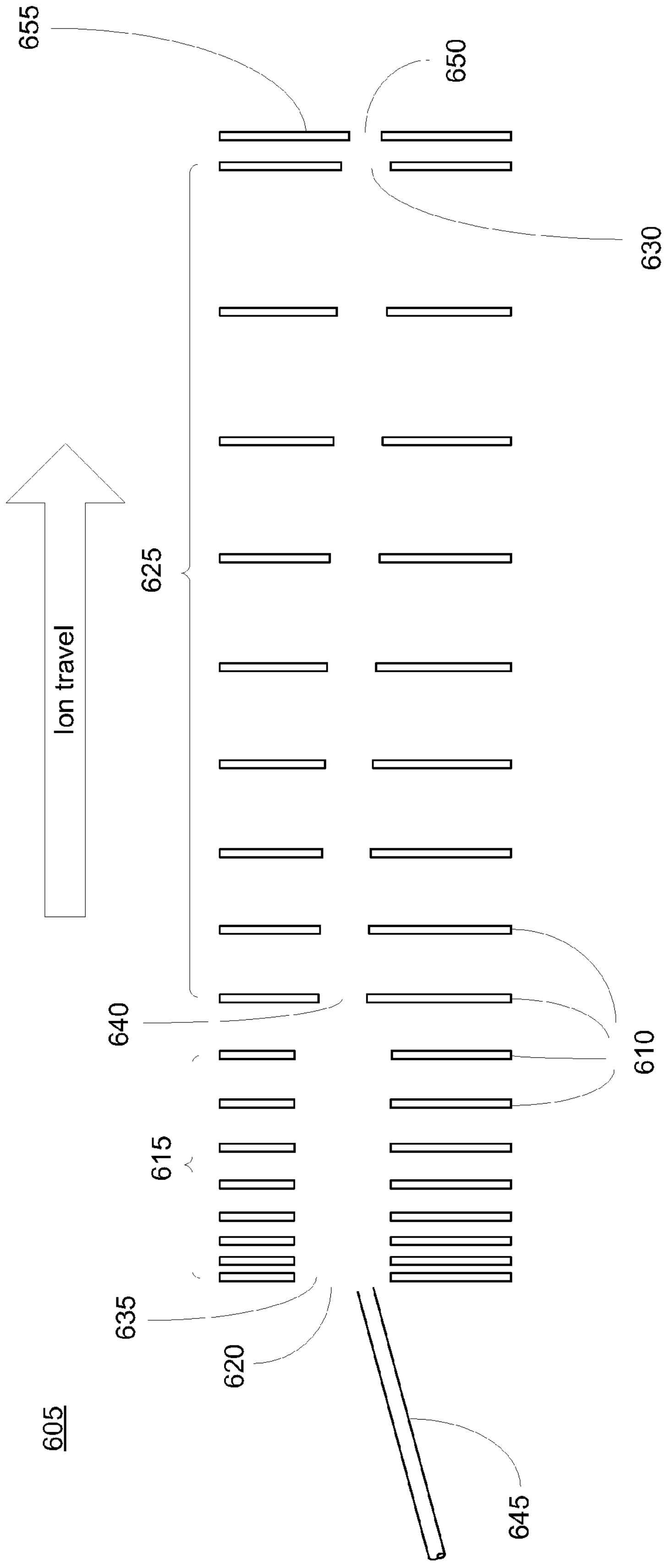
FIG. 6 depicts another implementation of the ion transport device, which utilizes a geometry intended to reduce streaming of neutral gas molecules and other undesirable particles into downstream regions of the mass spectrometer.

In the ion transport devices 105 and 500 of FIGS. 2 and 5, a substantially straight, unobstructed ion channel is established between the device entrance and exit. However, it may be advantageous to configure the ion transport device to impede streaming of neutral gas molecules, clusters and undesolvated droplets into the lower-pressure regions of the mass spectrometer, thereby improving signal-to-noise ratios and reducing pumping requirements. Referring to FIG. 6, an ion transport device 605 is depicted that incorporates multiple features to impede streaming of neutrals and other undesirable particles to downstream regions. Ion transport device 605 is constructed from a plurality of apertured electrodes 610 that are grouped into a first electrode set 615 positioned adjacent to device entrance 620, and a second set of electrodes 625 positioned adjacent to device exit 630. First electrode set 615 may have apertures 635 that are greater in size relative to apertures 640 of second electrode set 625. Ions are introduced to entrance 620 via an ion transfer tube 645 having an outlet that is laterally offset with respect to the center of aperture 635 of the initial electrode of first electrode set 615. Ion transfer tube 645, or a terminal segment thereof, has a central flow axis that is angularly offset (typically by about 5°) with respect to the central flow axis defined by the centers of apertures 635. In addition, the centers of apertures 640 of second electrode set 625 are laterally offset with respect to each other and the centers of apertures 635, such that no line-of-sight path exists between the outlet of ion transfer tube 645 and the central aperture 650 of exit lens 655. In this manner, analyte ions must follow an arcuate path to traverse the length of ion transport device and pass through lens aperture 650. Unlike the analyte ions, the trajectories of neutrals (together with high-mass charged particles such as undesolvated droplets and solvent-ion adducts) entering ion channel 605 are not affected or affected to a lesser degree by the resultant laterally shifting electric fields, and so the neutrals and high-mass particles tend to collide with the solid surfaces of electrodes and do not pass through lens aperture. It is noted that other implementations of the ion transport device designed to reduce streaming of neutrals may arrange the electrodes to define an S-shaped ion channel. Inhibition of neutral gas flow through the ion channel may also be accomplished using the jet disturber structure disclosed in U.S. Pat. No. 6,583,408, which consists essentially of a solid plate positioned in the ion/gas flow axis. A further reduction is streaming of neutrals to the mass analyzer may be achieved by utilizing an ion guide located downstream of the ion transport device that has a central axis that is curved and/or is laterally or angularly offset with respect to a longitudinal axis of the ion transport device.

While the RF and optional DC sources and connections have been omitted from FIG. 6 for simplicity and clarity, it will be recognized that RF and (optionally) DC voltages may be applied to electrodes 610 in the manner described above in connection with FIG. 2, i.e., RF voltages of equal amplitude and opposite phases may be applied in a sequentially alternating pattern to generate the radially confining field, and DC voltages having amplitudes increasing or decreasing in the direction of ion travel may be applied to generate a longitudinal DC field. Under certain conditions, it may be beneficial to apply RF voltages having a lower amplitude to electrodes of second electrode set 625 (relative to the amplitude of RF voltages applied to electrodes of first electrode set 615) in order to reduce the strength of the RF field experienced by ions traveling in the latter portion of the ion channel and thereby reduce unintended fragmentation.

Figure 9:
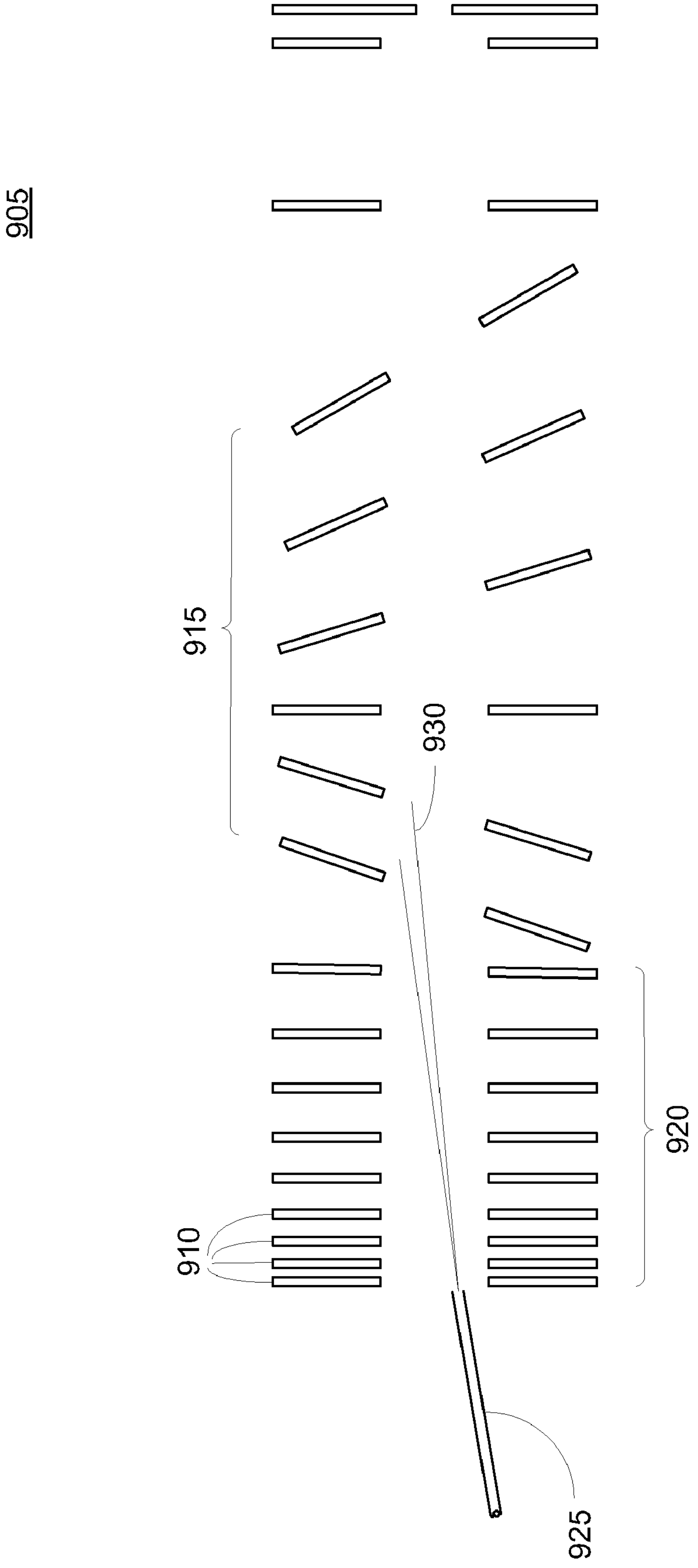
FIG. 9 depicts yet another implementation of the ion transport device, which utilizes a tilted ring electrode geometry to reduce the RF field strength in a region adjacent to the jet expansion.

One consequence of angularly offsetting the axis of the ion transfer tube (e.g., capillary) with respect to the central longitudinal axis of the ion transport device, as described above, is that ions will more closely approach the electrodes and will thereby be exposed to regions of relatively high RF field strength, in view of the increase in field strength with proximity to the electrodes. This may cause unintended fragmentation of labile analyte molecules. Two possible solutions to the problem of unintended fragmentation arising from off-axis ion introduction are represented by the designs depicted in FIGS. 9 and 10. Referring initially to FIG. 9, an ion transport device 905 is formed from a plurality of electrodes 910 having increasing average inter-electrode spacing in the direction of ion travel. A set 915 of electrodes are tilted with respect to each other and to non-tilted electrodes 920, such that each electrode of tilted set 915 defines a plane that is non-parallel with respect to adjacent electrodes. According to this arrangement, a segment of ion transport device 905 has inter-electrode spacings that are significantly smaller at the side of ion transport device 905 positioned opposite to the exit of angled capillary 925 (i.e., the side aligned with jet expansion 930 emanating from the capillary exit) relative to the corresponding inter-electrode spacings at the other side of ion transport device 905. As is noted above, RF field radial penetration increases with increasing inter-electrode spacing. The reduced inter-electrode spacing at the side opposite to the capillary exit results in decreased radial field penetration, and thus the ions in jet expansion 930 are exposed to lower RF field strength relative to an equivalent embodiment having parallel electrodes with symmetrical inter-electrode spacing. The lower RF field strength results in less undesirable fragmentation of analyte ions within the ion transport device.

Figure 10:
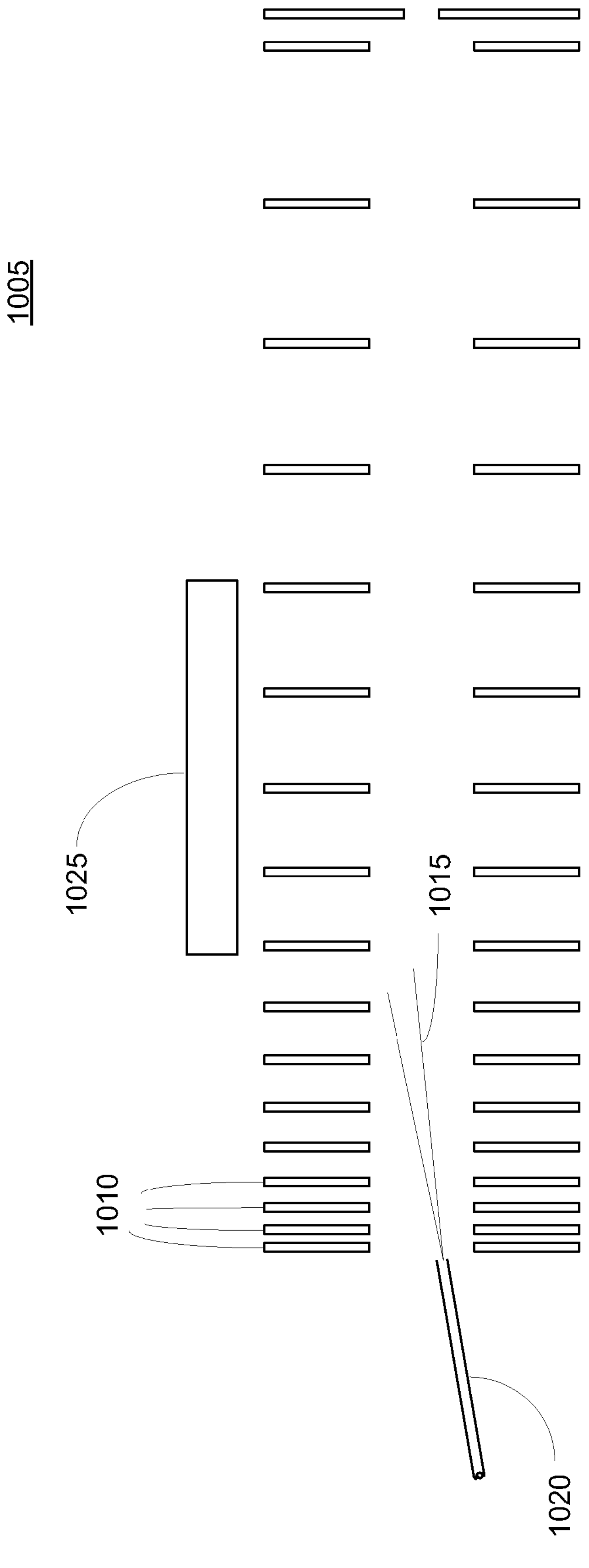
FIG. 10 depicts a further implementation of the ion transport device, which utilizes an asymmetric DC field to urge ions away from a region of high RF field strength.

FIG. 10 represents an alternative approach to reducing the problem of unintended fragmentation. An ion transport device 1005 includes a plurality of electrodes 1010 arranged with increasing inter-electrode spacing in the direction of ion travel. Ions are introduced into the interior of ion transport device 1005 as a jet expansion 1015 via an angled capillary 1020. In contradistinction to the FIG. 9 embodiment, ion transport device 1005 does not include a set of tilted electrodes. Instead, a DC electrode 1025 is positioned proximate to the side of electrodes 1010 located opposite to the exit of capillary 1020. A suitable voltage is applied to DC electrode 1025 to generate a radially asymmetric DC field that urges ions away from electrodes 1010 and toward the centerline of ion transport device 1005. This effect reduces exposure of the ions to high-strength RF fields existing near the electrodes and thereby prevents or reduces unintended fragmentation of analyte ions.

It is noted that although the RF and optional DC sources and connections have been omitted from FIGS. 9 and 10 to avoid unnecessary complexity, the RF and (optionally) DC voltages may be applied to the electrodes thereof in the manner described above in connection with FIG. 2, i.e., RF voltages of equal amplitude and opposite phases may be applied in a sequentially alternating pattern to generate the radially confining field, and DC voltages having amplitudes increasing or decreasing in the direction of ion travel may be applied to generate a longitudinal DC field.

It should be recognized that the techniques for generating a tapered radial field embodied by the FIG. 2 and FIG. 5 embodiments may be utilized separately or in combination, i.e., an ion transport device may include one or both of longitudinally increasing electrode spacing or longitudinally increasing oscillatory voltage amplitude to create the tapered field. Furthermore, one or both of these techniques may be combined with the physical taper technique (i.e., longitudinally decreasing aperture size) embodied by the device disclosed in U.S. Pat. No. 6,107,628 to Smith et al. Alternatively, and as depicted in the FIG. 6 embodiment and described above, the aperture size of the electrodes may be varied in a stepped fashion such that the ion transport device is segmented into a plurality of segments, each segment having a plurality of electrodes with identically sized apertures, wherein the aperture size in one segment is different from the aperture size in another segment (expressed in another fashion, each electrode would have at least one adjacent neighbor with the same aperture size).

Figure 7:
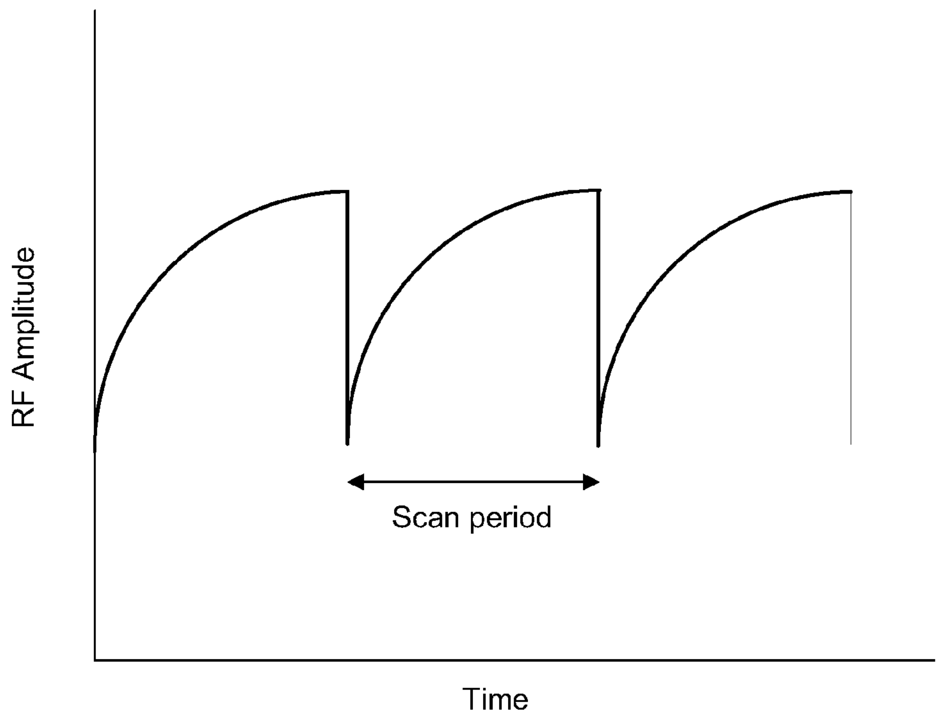
FIG. 7 depicts the application of a ramped-amplitude RF voltage to the ion transport device according to a mode of operation intended to maximize transmission of ions being analyzed by a quadrupole mass filter or similar mass analyzer.

It has been observed that for an ion transport device having progressively increasing inter-electrode spacing in the direction of ion travel, such as the device depicted in FIG. 2 and described above, the amplitude of the applied RF voltage at which ion transmission efficiency is maximized will increase with the mass-to-charge ratio (m/z) of the transmitted ions. In other words, for a given value of applied RF voltage, the ion transmission efficiency of the device may be m/z dependent, such that ions having a certain m/z value may be transmitted more or less efficiently relative to ions having different m/z's. In some situations, it may be beneficial to temporally vary the amplitude of the applied RF voltage in order to improve the overall instrument sensitivity. It is contemplated that there are at least two ways in which the RF voltage may be varied, depending on the type of mass analyzer utilized to acquire the mass spectra. In mass spectrometer instruments utilizing a continuous beam analyzer, such as a quadrupole mass filter, in which ions are filtered such that, at any given instant, only ions within a narrow range of m/z's are transmitted to the detector (or to other downstream components of the mass spectrometer), it may be useful to vary the RF voltage applied to the ion transport device to maximize the transmission efficiency of ions in the range of m/z's being transmitted/detected by the mass analyzer at that point in time. As the RF and/or DC voltages applied to the quadrupole mass filter (or corresponding voltages applied to another type of continuous beam analyzer) are varied in order to progressively change the m/z of the transmitted/detected ions (and thereby generate a mass spectrum), the amplitude of the RF voltage applied to the electrodes of the ion transport device is varied concurrently to maximize (at any given instant in time) transmission of ions having m/z's in the range being transmitted/detected by the mass analyzer. The RF voltage amplitude may be varied linearly with time (corresponding to the m/z of the measured ion species) or may instead be varied in a more complex time (m/z)-dependent manner. FIG. 7 depicts the variation of the RF amplitude applied to the ion transport device with time, whereby the RF amplitude is repeatedly ramped between predetermined amplitude values over a period corresponding to the scan period of a quadrupole filter mass analyzer. In this manner, the transport of transmitted/detected ions to the mass analyzer is optimized, which has a favorable effect on sensitivity. If the quadrupole mass filter or similar mass analyzer is being operated in "parked" mode (transmission at a temporally fixed range of m/z's) rather than scanned mode, then the RF voltage amplitude applied to the ion transport device electrodes may be maintained at a static value that maximizes transmission to the mass analyzer of the ion species being monitored.

For mass spectrometer instruments employing "pulsed" mass analyzers such as quadrupole ion traps (or instruments that use an intermediate ion store upstream of the mass analyzer), it may be useful to vary the amplitude of the RF voltage applied to the electrodes of the ion transport device over the injection period during which ions are accumulated within the mass analyzer or intermediate store. In an illustrative example, a value of RF amplitude may be applied at the beginning of the injection period that maximizes transmission for ions having relatively low m/z's. The RF voltage amplitude is then varied over the injection period (typically in a stepped or continuous fashion, but a more complex modulation of the voltage may also be utilized) so that transmission efficiency is increased for ions having progressively higher m/z's. In a related implementation, the injection time period is divided into a plurality of component sub-periods, which may or may not be of equal duration, and RF voltages of differing amplitudes are applied to the ion transport device during each of the sub-periods, with the RF voltage being removed during the intervals between consecutive injection sub-periods. By varying the maximum ion transmission efficiency over a range of m/z's, the resultant ion population accumulated within the mass analyzer may more closely approximate the population of ions produced at the source, without the undesirable discrimination against high or low m/z ions that would occur if the amplitude of the RF voltage applied to the ion transport device electrodes is maintained at a fixed value throughout the injection period. Selection of the applied voltages may take into account the m/z range of ions detectable by the mass analyzer, since no benefit will be realized by introducing ions into the mass analyzer that are outside (above or below) the range of detectable m/z's.

Figure 8:
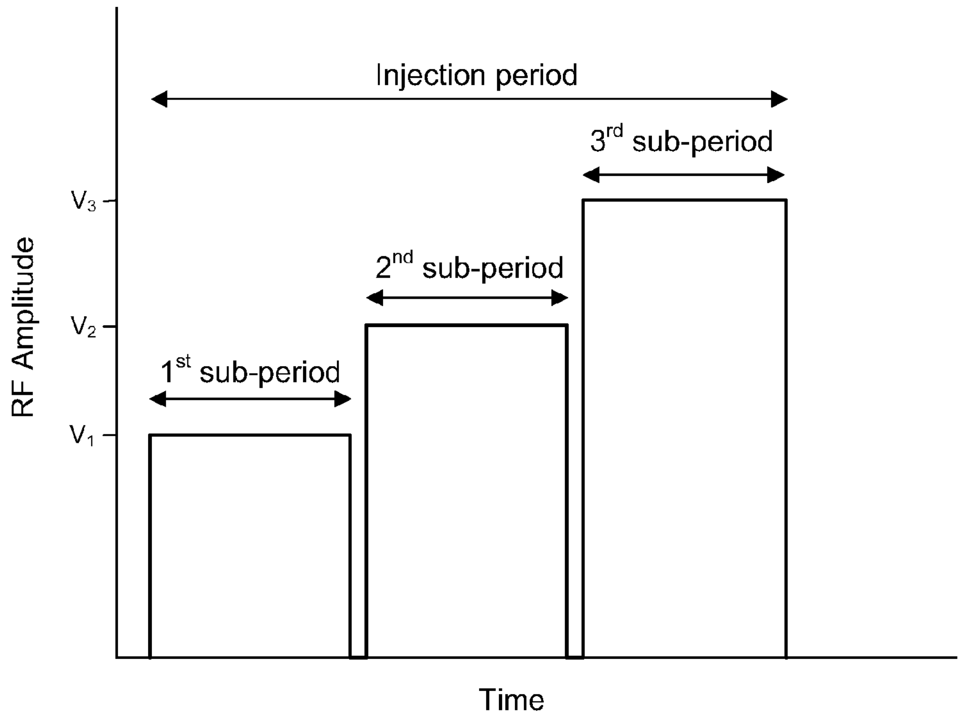
FIG. 8 depicts the application of a stepped-amplitude RF voltage to the ion transport device according to a mode of operation intended to reduce m/z-discrimination during an injection period.

FIG. 8 depicts an example of the variation of RF amplitude with time during an injection period, for example corresponding to the accumulation period of an ion trap mass analyzer. In this example, the injection period is divided into three component sub-periods, whereby the RF voltage is applied in three consecutive steps of increasing amplitude. In one specific implementation, the amplitudes applied during the three steps may be calculated as follows:

$$V_1=K^*\sqrt{(m/z)_{low}}$$

$$V_2=K^*\sqrt{(m/z)_{low}+f^*((m/z)_{high}-(m/z)_{low})}$$

$$V_3=K^*\sqrt{(m/z)_{high}}$$

wherein $V_1$, $V_2$ and $V_3$ are respectively the amplitudes of the applied oscillatory voltages at the first, second and third steps, $(m/z)_{low}$ and $(m/z)_{high}$ are respectively the lowest and highest values of m/z for the ions of interest, f is a constant<1 that may take, for example, the value of 0.3 and K is an adjustable constant (e.g., having a value of between 0 and 100). The values of $(m/z)_{low}$, $(m/z)_{high}$ and K may be supplied by the instrument operator via a graphical user interface or may alternatively be selected by an instrument controller in accordance with stored criteria.

Although FIG. 8 and the accompanying text depict and describe the application of the RF voltage in a progressively increasing fashion, it should be recognized that the voltage steps can be applied in any order without departing from the invention. Furthermore, as used herein, the terms first, second and third should not be construed as requiring a specific temporal sequence for applying the RF voltages, but instead are used simply to denote and distinguish different values of RF amplitudes.

It is to be understood that while the invention has been described in conjunction with the detailed description thereof, the foregoing description is intended to illustrate and not limit the scope of the invention.

We claim:

1. An ion transport device, comprising:

a plurality of longitudinally spaced apart electrodes defining an ion channel along which ions are transported, each of the plurality of electrodes being adapted with an aperture through which ions may travel; and an oscillatory voltage source configured to apply oscillatory voltages to at least a portion of the plurality of electrodes;

wherein the spacing between adjacent electrodes increases in the direction of ion travel; and wherein the plurality of electrodes includes a first set of electrodes positioned adjacent to a device entrance and a second set of electrodes positioned adjacent to a device exit, the electrodes of the first electrode set having apertures of a first fixed size and the electrodes of the second electrode set having apertures of a second fixed size, the second fixed size being smaller than the first fixed size.

2. The ion transport device of claim 1, further comprising means for generating a longitudinal DC field within the ion channel to assist in the transport of ions between an entrance and an exit of the ion channel.

3. The ion transport device of claim 2, wherein the means for generating the longitudinal DC field includes a DC voltage source configured to apply a set of DC voltages to at least a portion of the plurality of electrodes.

4. The ion transport device of claim 1, wherein the apertures of the plurality of electrodes are aligned to define a substantially straight ion channel.

5. The ion transport device of claim 1, wherein at least some of the apertures of ones of the plurality of electrodes are laterally offset with respect to apertures of adjacent electrodes.

6. The ion transport device of claim 5, wherein the ion channel is S-shaped.

7. The ion transport device of claim 5, wherein the ion channel is arcuate.

8. The ion transport device of claim 1, further comprising a jet disruptor interposed between two adjacent electrodes.

9. The ion transport device of claim 1, wherein the spacing between adjacent electrodes increases gradually in the direction of ion travel.

10. The ion transport device of claim 1, wherein the oscillatory voltage source is a radio-frequency voltage source.

11. The ion transport device of claim 1, wherein the plurality of electrodes includes a plurality of first electrodes arranged in interleaved relation with a plurality of second electrodes, the oscillatory voltage applied to the first electrodes being opposite in phase to the oscillatory voltage applied to the second electrodes.

12. The ion transport device of claim 1, wherein at least a portion of the plurality of electrodes are held within an enclosure that inhibits outflow of gas through gaps between electrodes.

13. A mass spectrometer, comprising:

an ion source;

a mass analyzer; and an ion transport device located intermediate in an ion path between the ion source and the mass analyzer, the ion transport device including:

a plurality of longitudinally spaced apart electrodes defining an ion channel along which ions are transported, each of the plurality of electrodes being adapted with an aperture through which ions may travel; and an oscillatory voltage source configured to apply oscillatory voltages to at least a portion of the plurality of electrodes;

wherein the spacing between adjacent electrodes increases in the direction of ion travel; and wherein the oscillatory voltage source is configured to temporally vary the amplitude of the applied oscillatory voltages.

14. The mass spectrometer of claim 13, further comprising means for generating a longitudinal DC field within the ion channel to assist in the transport of ions between an entrance and an exit of the ion channel.

15. The mass spectrometer of claim 14, wherein the means for generating the longitudinal DC field includes a DC voltage source configured to apply a set of DC voltages to at least a portion of the plurality of electrodes.

16. The mass spectrometer of claim 13, wherein at least some of the apertures of ones of the plurality of electrodes are laterally offset with respect to apertures of adjacent electrodes.

17. The mass spectrometer of claim 13, wherein the ion transport device is located within a chamber, and further comprising a pump in communication with the chamber for maintaining the pressure within the chamber between 0.1 and 10 Torr.

18. The mass spectrometer of claim 13, further comprising at least one elongated capillary for carrying ions from the ion source to the entrance of the ion transport device.

19. The mass spectrometer of claim 18, wherein the at least one elongated capillary includes multiple ion flow channels.

20. The mass spectrometer of claim 18, wherein the at least one capillary defines at its exit portion a capillary flow axis, the capillary flow axis being angled with respect to a central longitudinal axis of the ion transfer device.

21. The mass spectrometer of claim 13, further comprising a multipole ion guide positioned intermediate in the ion path between the ion transport device and the mass analyzer, the multipole ion guide defining a central longitudinal axis that is offset with respect to a central longitudinal axis of the ion transport device.

22. The mass spectrometer of claim 13, wherein the mass analyzer comprises a quadrupole mass filter operable to transmit ions having mass-to-charge ratios within a selected range and to temporally scan the selected range, and the oscillatory voltage source is configured to dynamically adjust the amplitude of the applied voltages to maximize transmission of the ions being transmitted by the quadrupole mass filter at that point in time.

23. The mass spectrometer of claim 13, wherein the mass spectrometer comprises an ion trap, located downstream in the ion path from the ion transport device, into which ions are injected during an injection period, and wherein the oscillatory voltage source is configured to vary the amplitude of the applied voltages during the injection period.

24. The mass spectrometer of claim 23, wherein the mass analyzer includes the ion trap.

25. The mass spectrometer of claim 23, wherein the amplitude of the applied voltages is varied in discrete steps.

26. The mass spectrometer of claim 25, wherein the discrete steps consist of first, second and third steps.

27. The mass spectrometer of claim 26, wherein the amplitudes of the first, second and third steps are calculated as follows:

$$V_1=K*\sqrt{(m/z)_{low}}$$

$$V_2=K*\sqrt{(m/z)_{low}+f*((m/z)_{high}-(m/z)_{low})}$$

$$V_3=K*\sqrt{(m/z)_{high}}$$

wherein $V_1$, $V_2$ and $V_3$ are respectively the amplitudes of the applied oscillatory voltages at the first, second and third steps, $(m/z)_{low}$ and $(m/z)_{high}$ are respectively the lowest and highest values of m/z for the ions of interest, f is a constant<1, and K is a user-adjustable constant.

28. A method for transporting and focusing ions within a low vacuum or atmospheric pressure region of a mass spectrometer, comprising:

providing an ion transport device having a plurality of longitudinally spaced apart electrodes, each electrode having an aperture, the electrodes defining an ion channel along which ions travel, wherein the longitudinal spacing of the electrodes increases in the direction of ion travel;

receiving ions at an entrance end of the ion transport device;

applying oscillatory voltages to at least a portion of the plurality of electrodes to generate an electric field that radially confines and focuses ions within the ion channel as the travel to an exit end of the ion transport device; and dynamically adjusting the amplitude of the applied oscillatory voltages to maximize transmission of ions having mass-to-charge ratios of interest.

29. The method of claim 28, further comprising a step of generating a longitudinal DC field to assist in the transport of ions along the ion channel.

30. The method of claim 28, wherein at least two electrodes of the plurality of electrodes have apertures of different size.

31. The method of claim 28, wherein the amplitude is adjusted to maximize transmission of the ions being transmitted by a downstream quadrupole mass filter at that point in time.

32. The method of claim 28, wherein the amplitude is adjusted in discrete steps during a period of injecting ions into a downstream ion trap.

33. The mass spectrometer of claim 20, wherein the plurality of electrodes includes a set of tilted electrodes, each electrode of the tilted electrodes defining a plane that is non-parallel with respect to a plane defined by an adjacent electrode, such that the spacing between adjacent electrodes is smaller on a side of the ion transport device opposite to the capillary is smaller relative to the corresponding spacing on the other side.

34. The mass spectrometer of claim 20, further comprising a DC electrodes positioned proximate to a side of the ion transport device opposite to the capillary.

* * * * *